United States Patent [19]

Sakuragi

[11] Patent Number: 4,816,936
[45] Date of Patent: Mar. 28, 1989

[54] AUTOMATIC CUING DEVICE
[75] Inventor: Toshio Sakuragi, Tokyo, Japan
[73] Assignee: Clarion Co., Ltd., Tokyo, Japan
[21] Appl. No.: 13,833
[22] Filed: Feb. 12, 1987

[30] Foreign Application Priority Data
Feb. 20, 1986 [JP]    Japan ............................... 61-24117[U]

[51] Int. Cl.⁴ ........................ G11B 5/00; G11B 15/18; G11B 27/18
[52] U.S. Cl. .................................... 360/72.2; 360/18; 360/72.1; 360/74.4
[58] Field of Search .................... 360/72.1, 72.2, 74.4, 360/18, 32, 13

[56]    References Cited
U.S. PATENT DOCUMENTS

| | | | |
|---|---|---|---|
| 4,445,149 | 4/1984 | Bluethgen | 360/13 |
| 4,587,577 | 5/1986 | Tsunoda | 360/72.2 |
| 4,623,941 | 11/1986 | Juso et al. | 360/18 |
| 4,634,386 | 1/1987 | Tamaki | 360/72.2 X |
| 4,641,208 | 2/1987 | Inazawa et al. | 360/72.2 |
| 4,663,678 | 5/1987 | Blum | 360/72.2 |
| 4,669,000 | 5/1987 | Odaka et al. | 360/32 |

FOREIGN PATENT DOCUMENTS

| | | | |
|---|---|---|---|
| 55-97071 | 7/1980 | Japan | 360/72.2 |
| 61-134978 | 6/1986 | Japan | 360/72.2 |

Primary Examiner—John H. Wolff
Attorney, Agent, or Firm—Flynn, Thiel, Boutell & Tanis

[57]    ABSTRACT

A system having a system control section and a tape driving mechanism section, in the case where a tape in which subcode data representing the beginning position of a tune is recorded is reproduced, takes out the subcode data from reproduced signals, judges whether the beginning portion of the tune is being reproduced or not, and if is not, makes a tape driving mechanism carry out a search operation so that the tune is reproduced from its beginning.

2 Claims, 4 Drawing Sheets

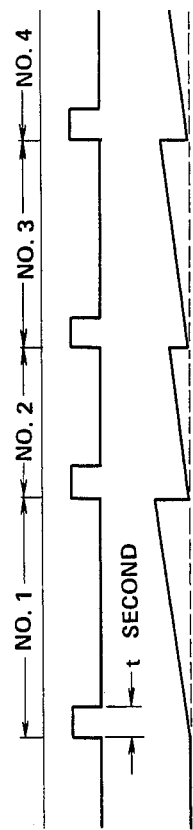
FIG. 5A
FIG. 5B
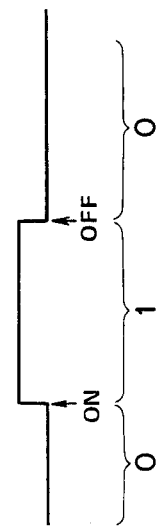
FIG. 6

AUTOMATIC CUING DEVICE

FIELD OF THE INVENTION

This invention relates to an automatic cuing device used in an apparatus for reproducing audio signals recorded on a magnetic tape.

BACKGROUND OF THE INVENTION

At present a compact cassette tape recorder, a PCM (pulse code modulation) reproducing device for an 8 mm VTR (video tape recorder), and similar devices are each known as an apparatus for reproducing audio signals recorded on a magnetic tape.

When signals are reproduced by means of these devices, the tape is not always rewound, but it happens often that they are reproduced starting in midcourse of a tune.

Consequently, when it is desired that the tape be set at the beginning of a tune, it is necessary to move the tape forward or backward, which is an inconvenience in that this operation takes some time.

On the other hand, for the reproduction of a type of tape where a no recording portion is inserted between two successive tunes, such as a tape in which only accompaniment is recorded, etc., if the tape is set in the middle of a tune, a cuing operation is necessary.

OBJECT OF THE INVENTION

An object of this invention is to provide an automatic cuing device which will avoid reproduction starting in the middle of a tune.

SUMMARY OF THE INVENTION

In order to achieve this object, an automatic cuing device according to this invention comprises a magnetic recording reproduction device for reproducing digital signals, each consisting of an audio code and a subcode concerning the position of the audio code, for each of the tunes memorized in a recording medium; recognition means for recognizing the audio code and the subcode from the digital signals; a first memory and a second memory for storing the audio code and the subcode, respectively, and control means for judging whether the reproduction of the beginning portion of the tune corresponding to the subcode stored in the second memory is being reproduced and, if it is not, making a recording medium driving mechanism of said magnetic recording reproduction device carry out a search operation and, when the tape is at the beginning position, stopping the search operation.

For example, in a digital audio tape recorder (hereinbelow abbreviated to DAT), not only audio signals are recorded by PCM, but also information concerning the recording position on the tape, such as the number of a tune, the running time of the tune, a start flag, etc., can be recorded as subcode data.

This invention consists in utilizing these subcode data for the tape on which they are recorded.

BRIEF DESCRIPTION OF THE DRAWINGS

FIGS. 5(a) and (b) show a waveform indicating a concrete example of the subcode data;

FIG. 6 shows the waveform for explaining a reel motor switch-on signal; and

DETAILED DESCRIPTION

Hereinbelow this invention will be explained by taking a DAT (digital analog tape) device as an example.

Figure 1:
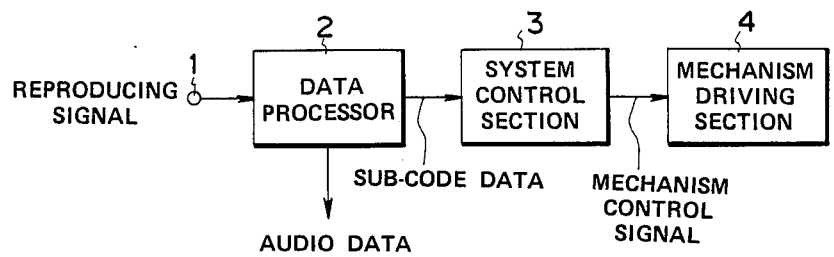
FIG. 1 is a block diagram illustrating the construction of an automatic cuing device according to this invention.

FIG. 1 is a block diagram illustrating the construction of an automatic cuing device according to this invention, in which the reference numeral 1 is an input terminal for signals to be reproduced; 2 is a data processor; 3 is a system control section, such as a computer, etc.; and 4 is a well-known mechanism driving section for DAT devices.

Figure 2:
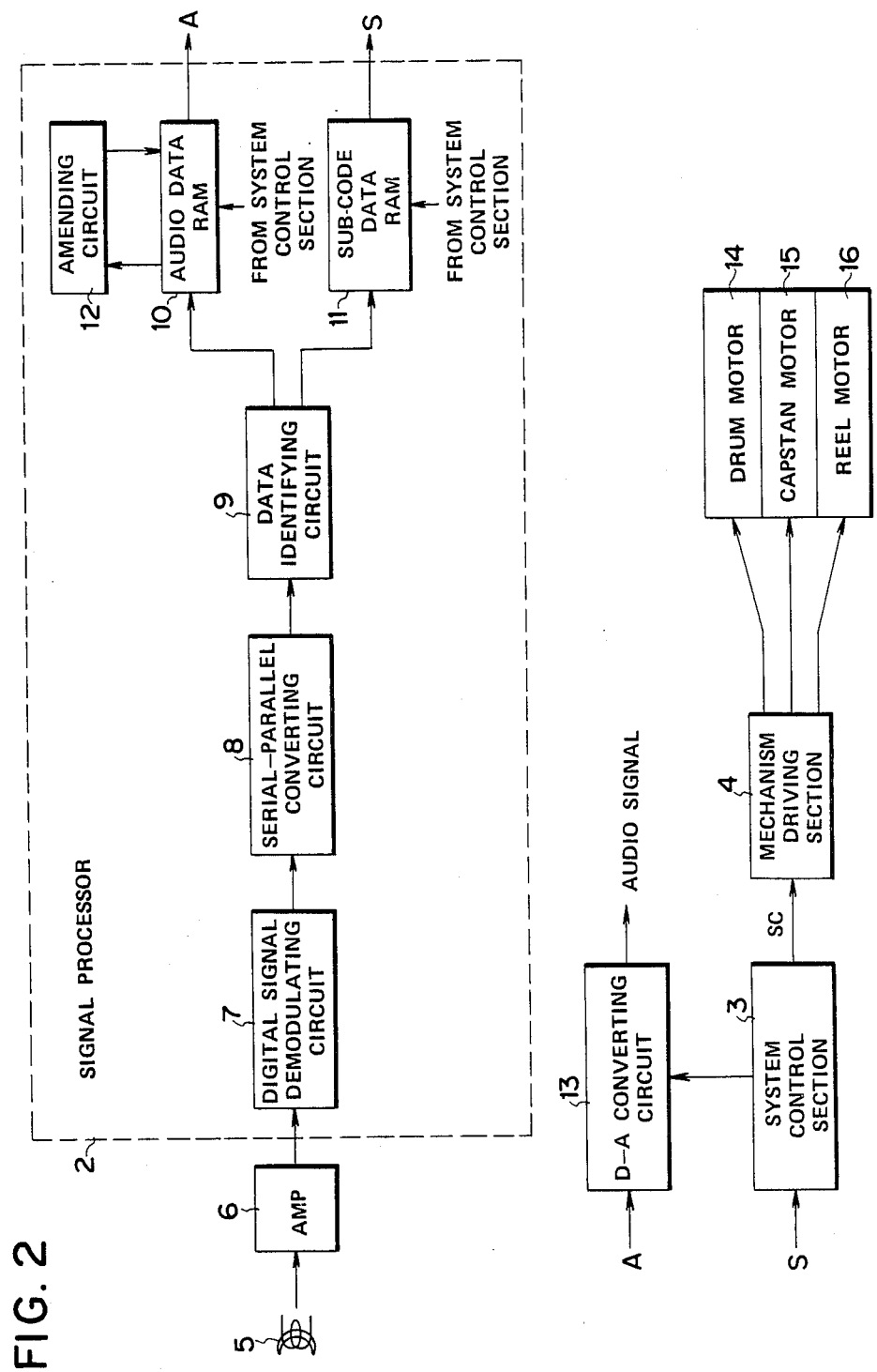
FIG. 2 is a block diagram illustrating the construction of a DAT device including the automatic cuing device according to this invention.

FIG. 2 is a block diagram illustrating the construction of the DAT device including the automatic cuing device according to this invention, in which the reference numeral 5 is a head of the DAT device; 6 is an amplifier; 7 is a digital signal demodulation circuit; 8 is a serial/parallel converting circuit; 9 is a data identifying circuit; 10 is an audio data RAM; 11 is a subcode data RAM; 12 is a amending circuit; 13 is a D/A (digital to analog) converting circuit; 14 is a drum motor of DAT device; 15 is a capstan motor of the DAT device; and 16 is a reel motor of the DAT device.

Figure 3A:
FIGS. 3(a) and (b) indicate the correspondence between reproduced signals and digital signals.
Figure 3B:
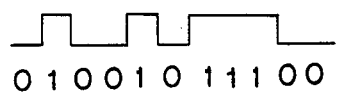

The signals reproduced by the head 5 from the magnetic tape (FIG. 3 (a)) are restored to digital data (FIG. 3 (b)) in the digital signal demodulation circuit 7. These data contain the subcode data stated above and audio data corresponding to the audio signals, and further the audio data and the subcode data contain codes for identifying them from each other. These data are transformed into parallel data in the serial/parallel inverter circuit 8 and are stored in predetermined respective addresses in the RAM 10 or 11, after it has been judged whether they are audio data or subcode data.

Figure 4:
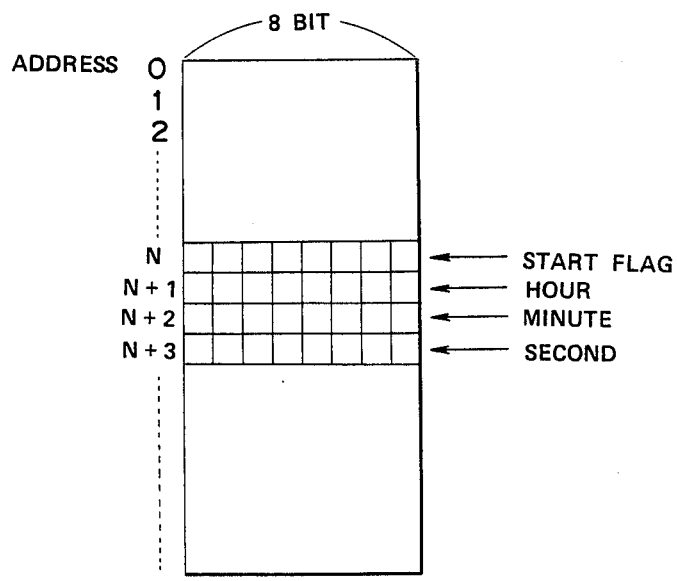
FIG. 4 illustrates the structure of a subcode data RAM.

FIG. 4 illustrates a concrete example of data in the subcode data RAM. In the example illustrated in the figure the LSB of the address N is the start flag (e.g. at the beginning (0000 000 1) and otherwise (0000 0000)). In the address concerning the time codes the address N+1 represents the hour, N+2 the minute, and N+3 the second. Since each of these time codes consist of 8 bits, they are represented by the 2 digit BCD representation (e.g. 58 seconds can be represented by (0101 1000)).

The subcode data are digital data and recorded in the RAM, as indicated in FIG. 4. Further the addresses, in which the tape position information (the start flag, the time codes, etc.) should be written, are determined. Consequently the data needed by the system control section 3 can be read-out easily from the respective addresses of the RAM 11. The start flag is so designed that the state "1" continues during t seconds at the head of each of tunes No. 1–No. 4 and otherwise the state is "0", as indicated in FIG. 5 (a). On the other hand the time code increases by 1 for every second from the beginning to the end of the tune N as 0, 1, 2, 3, . . . , as indicated in FIG. 5 (b).

As stated above, the signals to be reproduced are inputted to the data processor 2, in which they are demodulated and the subcode data separated from the audio data is inputted into the system control section 3. The system control section 3 reads out any time tape position information from the RAM 11 and on the basis of the result thus obtained generates instruction signals sent to the mechanism driving section 4 as tape driving mechanism controlling signals SC, such as motor on/off, normal/reverse direction of rotations, number of rotation, of the motors, etc.

The tape driving mechanism controlling signals SC are those instructing the motor controlling circuit within the mechanism driving section 4 about motor on/off, normal/reverse direction of rotation, and number of rotations of the motors 14, 15 and 16. Concretely speaking, the motors 14, 15 and 16 are controlled by signals consisting of low and high levels (0/1), as indicated in FIG. 6.

Figure 7:
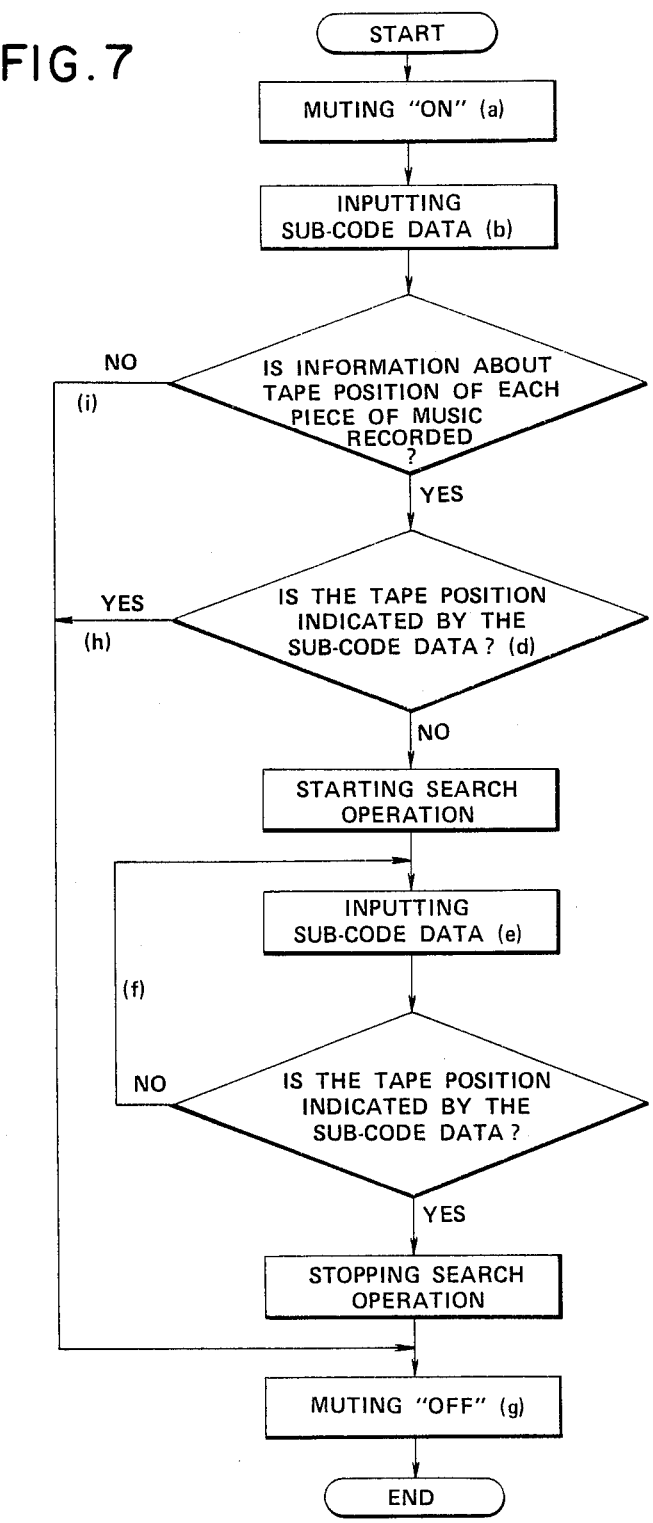
FIG. 7 is a flow chart for explaining the operation of the system control section.

FIG. 7 is a flow chart for explaining the operation of the system control section 3.

(a) Before starting the operation, muting means in the DAT device is switched on so that the audio signals are not reproduced as sound.

(b) The reproduction operation is started and the subcode data delivered by the data processor 2 are inputted.

(c) It is detected whether the tape position information of the desired tune is recorded in the inputted subcode data or not.

(d) It is judged on the basis of the subcode data thus detected whether the signals being reproduced are obtained from the beginning of the tune, and if they are not, the mechanism driving section 4 is instructed to start a search operation (recorded information is read-out while driving the tape not with the reproduction speed but with a high search speed).

(e) Subsequently the reproduced subcode data are inputted.

(f) According to a judgment on the basis of the inputted subcode data, (b)~(e) and (f) are repeated, until the beginning of the desired tune is obtained.

When the system control section 3 judges that the beginning of the desired tune is obtained, it instructs the mechanism driving section 4 to stop the search operation.

(g) The muting is turned off and the usual reproduction operation is carried out.

(h) Also when it is judged at (d) that the signals to be reproduced are obtained at the beginning of the desired tune, the usual reproduction operation is carried out, as at (g).

(i) If no tape position information is detected at (c), the muting is turned off and the usual reproduction operation is carried out.

Although the muting is turned on until the cuing operation is terminated in the above, the cuing operation can be effected in the state where the muting is turned off. This method has an advantage in that it can be recognized by the reproduced sound that the cuing operation is in progress. Further it is also possible that the cuing operation is effected after the insertion of a cassette and the operation of the driving mechanism remains in the stopped state after the termination of the cuing operation. According to this method an advantage can be obtained in that since the cuing operation is terminated, the reproduction preparation time can be shortened after the reproduction switch has been pushed.

As explained above, according to this invention, it is possible to start automatically the reproduction at the beginning of the desired tune without bothering the user.

The embodiments of the invention in which an exclusive property or privilege is claimed are defined as follows:

1. An automatic cuing device, comprising:

a magnetic recording and reproducing apparatus into which a magnetic tape can be removably inserted, having tape driving means for effecting lengthwise movement of the magnetic tape at a reproduction speed, and having means for reproducing audio codes of respective pieces of music which are recorded on the tape and for reproducing subcode data which is recorded on the tape and specifies positions of the audio codes on the tape;

first judging means automatically activated in a reproducing mode commenced in response to one of a manual operation and completion of insertion of a tape for determining from the subcode data reproduced by said apparatus whether the reproduction of audio codes from the tape started from the beginning of one of the pieces of music;

means responsive to a determination by said first judging means that reproduction of audio signals started at a position other than the beginning of one of said pieces of music for causing said tape driving means of said magnetic recording and reproducing apparatus to effect lengthwise tape movement at a search speed faster than said reproduction speed;

second judging means for determining from the subcode data reproduced during tape movement at said search speed whether the tape position corresponds to the beginning of one of the pieces of music; and means for causing said tape driving means to terminate tape movement at said search speed and to resume tape movement at said reproduction speed in response to a determination by said second judging means that the tape position corresponds to the beginning of one of the pieces of music.

2. An automatic cuing device, comprising:

a magnetic recording and reproducing apparatus into which a magnetic tape can be removably inserted, having tape driving means for effecting lengthwise movement of the magnetic tape at a reproduction speed, and having means for reproducing audio codes of respective pieces of music which are recorded on the tape and for reproducing subcode data which is recorded on the tape and specifies positions of the audio codes on the tape;

muting means for establishing a muting mode at the start of a reproducing mode commenced in response to one of a manual operation and completion of insertion of a tape, wherein in said muting mode said muting means mutes an audio signal derived from said audio codes;

first judging means automatically activated in the reproducing mode for determining from the subcode data reproduced by said apparatus whether the reproduction of audio codes from the tape started from the beginning of one of the pieces of music;

means responsive to a determination by said first judging means that reproduction of audio signals started at a position other than the beginning of one of the pieces of music for causing said tape driving means of said magnetic recording and reproducing apparatus to effect lengthwise tape movement at a search speed faster than said reproduction speed;

second judging means for determining from the subcode data reproduced during the tape movement at said search speed whether the tape position corresponds to the beginning of one of the pieces of music; and means for cancelling said muting mode established by said muting means and for causing said tape driving means to terminate tape movement at said search speed and to resume tape movement at said reproduction speed in response to a determination by said second judging means that the tape position corresponds to the beginning of one of the pieces of music.

* * * * *